(12) United States Patent
Youtz et al.

(10) Patent No.: US 11,595,869 B2
(45) Date of Patent: Feb. 28, 2023

(54) SYSTEM AND METHOD FOR ENABLING CELL RESELECTION

(71) Applicant: Verizon Patent and Licensing Inc., Basking Ridge, NJ (US)

(72) Inventors: Andrew E. Youtz, Princeton, NJ (US); Hui Zhao, Marlboro, NJ (US); Susan Wu Sanders, Bridgewater, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 99 days.

(21) Appl. No.: 17/233,800

(22) Filed: Apr. 19, 2021

(65) Prior Publication Data

US 2022/0338080 A1 Oct. 20, 2022

(51) Int. Cl.
*H04W 36/08* (2009.01)
*H04W 76/30* (2018.01)
*H04W 36/06* (2009.01)
*H04W 36/00* (2009.01)

(52) U.S. Cl.
CPC ....... *H04W 36/08* (2013.01); *H04W 36/0061* (2013.01); *H04W 36/06* (2013.01); *H04W 76/30* (2018.02)

(58) Field of Classification Search
CPC . H04W 36/06; H04W 36/0061; H04W 36/08; H04W 76/30
See application file for complete search history.

(56) References Cited

U.S. PATENT DOCUMENTS

| | | | | |
|---|---|---|---|---|
| 2017/0374695 A1* | 12/2017 | Lau | .............. | H04L 65/1069 |
| 2018/0152272 A1* | 5/2018 | Chae | .............. | H04W 48/12 |
| 2019/0281587 A1* | 9/2019 | Zhang | .............. | H04W 72/10 |
| 2019/0289531 A1* | 9/2019 | Takahashi | .............. | H04W 48/08 |
| 2021/0007025 A1* | 1/2021 | Kumar | .............. | H04W 8/245 |
| 2021/0044993 A1* | 2/2021 | Jha | .............. | H04W 36/0083 |
| 2021/0176656 A1* | 6/2021 | Sang | .............. | H04W 24/10 |
| 2021/0289404 A1* | 9/2021 | Tseng | .............. | H04W 48/18 |
| 2021/0297911 A1* | 9/2021 | Jung | .............. | H04W 76/30 |
| 2021/0345210 A1* | 11/2021 | Chen | .............. | H04W 36/00835 |
| 2021/0377844 A1* | 12/2021 | Tseng | .............. | H04W 72/0453 |
| 2022/0014980 A1* | 1/2022 | Tseng | .............. | H04W 48/12 |
| 2022/0015029 A1* | 1/2022 | Wang | .............. | H04W 48/20 |
| 2022/0030453 A1* | 1/2022 | Kumar | .............. | H04W 36/06 |
| 2022/0201790 A1* | 6/2022 | Jung | .............. | H04W 48/08 |
| 2022/0248493 A1* | 8/2022 | Kim | .............. | H04W 36/0033 |
| 2022/0264697 A1* | 8/2022 | Shimoda | .............. | H04W 76/20 |
| 2022/0295584 A1* | 9/2022 | Jin | .............. | H04W 76/15 |

FOREIGN PATENT DOCUMENTS

| | | | | |
|---|---|---|---|---|
| CN | 111885658 A | * | 11/2020 | ........ H04W 36/0055 |
| WO | WO-2021230482 A1 | * | 11/2021 | |

* cited by examiner

*Primary Examiner* — Chi H Pham
*Assistant Examiner* — Vladislav Y Agureyev

(57) ABSTRACT

A method, a system, and a non-transitory storage medium are described which provide for generating, by a wireless station of a multi-radio access technology (RAT) radio access network (RAN) that includes a new radio (NR) RAN and a RAN of a Long Term Evolution (LTE) network, a non-system information block (SIB) message that includes cell reselection priority information and NR stand-alone (SA) neighboring cell information, wherein an order of priority configures an end device attached to the LTE RAN to reselect to a first radio frequency (RF) channel of a first NR SA neighboring cell; and broadcasting the non-SIB message to the end device.

20 Claims, 6 Drawing Sheets

SYSTEM AND METHOD FOR ENABLING CELL RESELECTION

BACKGROUND

Fifth generation (5G) new radio (NR) wireless networks offer increased capacity and speed over other wireless networks. As 5G NR networks are introduced, both Fourth generation wireless (4G) and 5G networks may provide wireless connectivity to a user equipment device (UE) to enable fast and reliable services. In wireless coverage areas that support both 4G and 5G connectivity, it may be preferable—from a network-side perspective and/or a UE-side perspective—for a UE to camp on a 5G NR standalone (SA) cell providing service having increased bandwidth and reduced latency.

DETAILED DESCRIPTION

Figure 1:
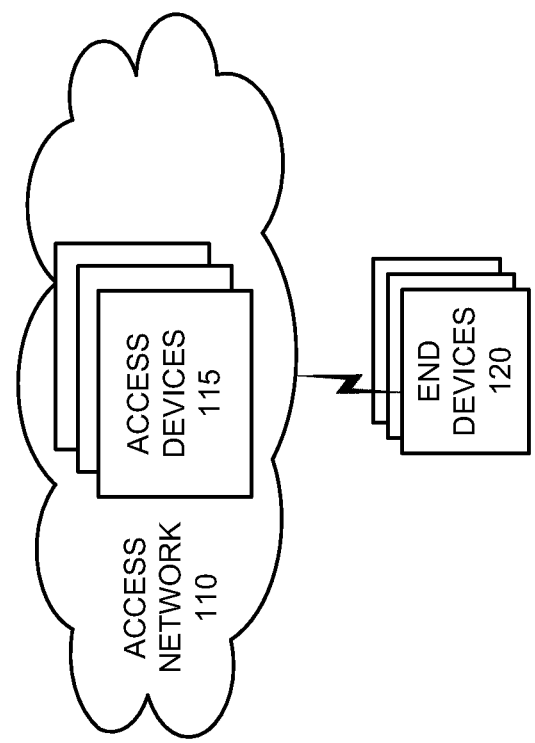
FIG. 1 is a diagram illustrating an exemplary environment in which an exemplary embodiment of a cell reselection enablement service may be implemented.

The following detailed description refers to the accompanying drawings. The same reference numbers in different drawings may identify the same or similar elements. Also, the following detailed description does not limit the invention.

To expedite the adoption of 5G networks, 5G cells may be introduced into areas where 4G cells already exist. For example, a 5G NR non-standalone (NSA) mode may be deployed where data packets are exchanged via 5G networks, and control plane functionality is supported by long term evolution (LTE) networks, which may appear the same as LTE from a radio access technology (RAT) perspective. In contrast, when 5G NR SA configurations are introduced, 5G NR networks may operate in an SA mode without the assistance of an LTE network, where the 5G NR SA network is used for both user and control planes as if another independent RAT. The UE may have RATs compatible with both 5G NR SA (e.g., a 5G RAT) and NSA modes (e.g., a 4G RAT).

For UEs capable of both 5G SA and NSA operation, even though it may be desirable for the UE to camp on 5G bands (including, for example, millimeter wave technologies and sub 6 GHz frequencies) for improved throughput and reduced latency, scanning for 5G by the UE located in a scattered 5G deployment environment may be inefficient. However, without sufficient information to identify available neighboring NR 5G SA cells and/or reselection priorities that are based on network design and loading, the UE may encounter protracted mode transition (e.g., idle mode to connected mode) and/or system acquisition times, as well as select/reselect to a lower priority 5G NR SA band, potentially negatively impacting the user experience and the cells themselves. Accordingly, in areas having neighboring and/or overlapping 4G and 5G cells, 4G base stations often transmit information to expedite UEs establishing wireless connections with neighboring 5G base stations. For example, a 4G base station may broadcast over a system information block (SIB) information regarding one or more 5G base stations. In particular, an LTE base station may broadcast frequency information of a neighboring 5G base station over Information Element (IE) System Information Block Type 24 (hereinafter "SIB 24").

SIB 24 may contain information relevant for inter-RAT cell selection/reselection (that is, information about NR frequencies and NR neighboring cells relevant for cell selection/reselection). SIB 24 may include cell selection/reselection parameters common for a high priority frequency and/or a plurality of high priority frequencies. The frequency information in SIB 24 may be used by a UE receiving the broadcast information to expedite idle mode transitions from LTE to 5G NR SA, and ensure that the UE selects/reselects to the highest priority 5G NR SA band based on network design and loading conditions, for example.

However, some legacy LTE UEs lose at least partial functionality in response to an LTE base station broadcasting SIB 24 (or other standards-based solution). Given the age of some of the impacted legacy UEs, software updates to correct the issue may be impracticable. Further, given the number of impacted legacy LTE UEs, replacing them may not represent the best option. Embodiments described herein provide an approach for a UE camped on a 4G LTE cell to efficiently determine whether 5G coverage is available in a 4G cell it is camped on, and configure the UE to prioritize connectivity to the highest priority frequency band of an available 5G NR SA cell, while minimizing or eliminating the disadvantages of broadcasting SIB 24 within an LTE cell. As used herein, the term "camping" may refer to a UE being in an idle mode, thus maintaining limited exchanges with a wireless network within the confines of a previously selected cell. While camping, a UE may, for example, read messages to determine the availability of a higher priority system, monitor a paging channel to detect incoming calls and acquire system information, perform control plane protocols including cell selection and reselection procedures (referred to herein as "cell reselection"), etc.

According to some embodiments, a cell reselection enablement service is provided. According to an embodiment, the cell reselection enablement service may configure cell selection and cell reselection (referred to herein as "cell selection") procedures and priorities pertaining to frequency bands on RAN devices of a multi-RAT RAN, as described herein. For example, a serving LTE Evolved Node B (eNodeB) may be configured to generate a non-SIB message that includes cell reselection priority information and NR SA neighboring cell information, and transmit the non-SIB message to a UE when the UE transitions from a radio resource connected (RRC) connected mode to an RRC idle mode. In an embodiment, the eNodeB (eNB) may generate an RRC connection release message that includes the reselection and neighboring cell information when the eNB decides to release the UE to idle mode based on inactivity of the UE while in the RRC connected mode. According to another embodiment, the eNB may use a reselection timer while the UE remains in RRC connected mode to periodically configure the UE to scan in search of the identified highest priority frequency band of an NR SA neighboring cell. For example, the eNB may determine that the UE has not transitioned from RRC connected mode to RRC idle mode due to inactivity from initiation to expiration of the reselection timer. The eNB may use an RRC message other than an RRC connection release message to communicate the reselection and neighboring cell information, as described herein.

In view of the foregoing, the cell reselection enablement service may use non-SIB messages, such as RRC connection release messages or another type of RRC message to direct a UE camped on LTE to reselect to a highest priority frequency band of a 5G NR SA neighboring cell. Accordingly, the LTE cell reselection enablement service may eliminate the need for base stations to broadcast SIB 24 messages to accomplish the reselection.

FIG. 1 is a diagram illustrating an exemplary environment 100 in which an exemplary embodiment of the cell reselection enablement service may be implemented. As illustrated, environment 100 includes an access network 110. Environment 100 further includes end devices 120 (also referred to individually or generally as end device 120).

The number, type, and arrangement of networks illustrated in environment 100 are exemplary. For example, according to other exemplary embodiments, environment 100 may include additional networks and/or different networks. For example, according to other exemplary embodiments, other networks not illustrated in FIG. 1 may be included, such as an X-haul network (e.g., backhaul, midhaul, fronthaul, etc.), a transport network (e.g., Signaling System No. 7 (SS7), etc.), a core network, an application layer network, and/or another type of network that may support a wireless service and/or an application service, as described herein.

The number, the type, and the arrangement of network devices, and the number of end devices 120 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 120 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 110 may include one or multiple networks of one or multiple types and technologies. For example, access network 110 may be implemented to include a 5G-access network (5G-AN) or a 5G-RAN, a future generation RAN (e.g., a 6G RAN or subsequent generation RAN). Access network 110 may include a legacy RAN (e.g., a Third Generation (3G) RAN, a 4G or 4.5 RAN, etc.). Access network 110 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 110, an external network, and/or a core network. According to an exemplary embodiment, access network 110 may be configured to support or provide the component carrier management service, as described herein.

Access network 110 may include different and multiple functional splitting, such as options 1, 2, 3, 4, 5, 6, 7, or 8 that relate to combinations of access network 110 and a core network including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), CU and DU, interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA NR, SA NR, etc.).

According to some exemplary embodiments, access network 110 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 110 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 110 may be implemented to include various wired and/or optical architectures for wired and/or optical access services.

Depending on the implementation, access network 110 may include one or multiple types of network devices, such as access devices 115 (also referred to individually or generally as access device 115). For example, access device 115 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN gNB (O-gNB), O-RAN eNB (O-eNB)), a 5G ultra-wide band (UWB) node, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 115 may include a wired and/or optical device (e.g., modem, wired access point, optical access point, Ethernet device, etc.) that provides network access. According to some exemplary implementations, access device 115 may include a combined functionality of multiple RATs (e.g., 4G and 5G functionality, 5G and 5.5G functionality, etc.) via soft and hard bonding based on demands and needs. According to some exemplary implementations, access device 115 may include an integrated functionality, such as a CU-CP and a CU-UP, or other integrations of split RAN nodes. Access device 115 may be an indoor device or an outdoor device.

According to various exemplary implementations, access device 115 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth. Depending on the implementation, access device 115 may provide a wireless access service at a cell, a sector, a sub-sector, carrier, and/or other configurable level. According to an exemplary embodiment, one or multiple types of access devices 115, as described herein, include logic that provide the component carrier management service.

End device 120 may include a device that may have computational and/or communication capabilities (e.g., wireless, wired, optical, etc.). End device 120 may be implemented as a mobile device, a portable device, a stationary device (e.g., a non-mobile device), a device operated by a user, or a device not operated by a user. For example, end device 120 may be implemented as a smartphone, a mobile phone, a personal digital assistant, a tablet, a netbook, a phablet, a wearable device (e.g., a watch, glasses, etc.), a computer, a gaming device, a music device, an Internet of Things (IoT) device, a drone, a smart device, or other type of wireless device (e.g., other type of user equipment (UE)). End device 120 may be configured to execute various types of software (e.g., applications, programs, etc.). The number and the types of software may vary among end devices 120.

End device 120 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 120 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 120 may vary among end devices 120. According to an exemplary embodiment, end device 120 includes the cell reselection enablement service, as described herein.

Figure 2A:
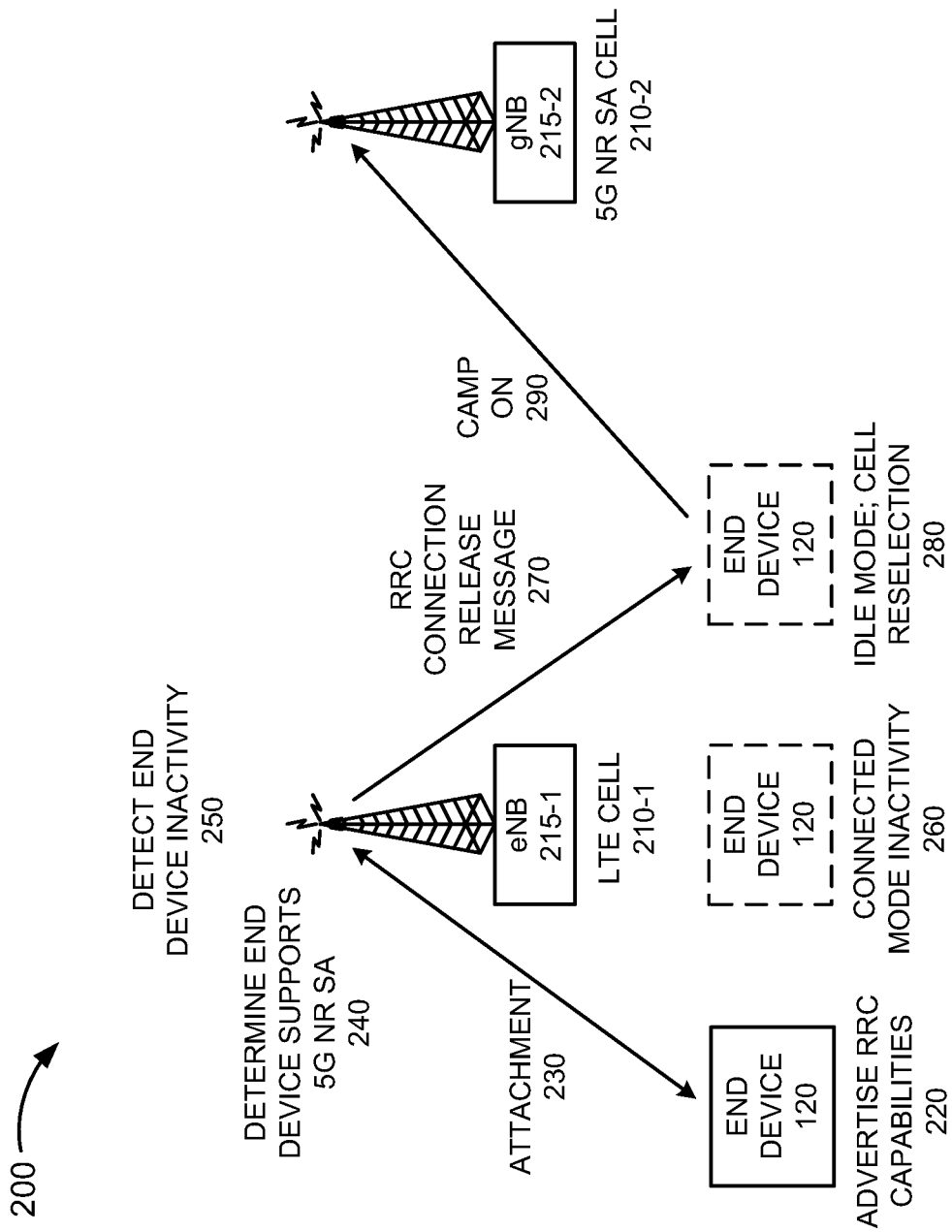
FIGS. 2A and 2B are diagrams illustrating another exemplary environment in which exemplary processes pf embodiments of the cell reselection enablement service may be implemented.

FIG. 2A is a diagram that illustrates an exemplary process 200 of the cell reselection enablement service. For example, end device 120 may, in an attachment procedure 230 with eNB 215-1 of an LTE cell 210-1, expose or advertise 220 the RRC capabilities of end device 120. For example, end device 120 may, using RRC signaling (e.g., an attachment request message), advertise that end device 120 is capable of 5G NR SA or another mode of operation. Based on the advertised information, eNB 215-1 may determine 240 that end device 120 supports 5G NR SA.

While end device 120 is operating in an RRC_CONNECTED mode relative to eNB 215-1, eNB 215-1 may detect 250 inactivity of end device 120 (also shown as connected mode inactivity 260 at end device 120) for a threshold amount of time and decide to transition end device 120 from RRC_CONNECTED mode to RRC_IDLE mode. Based on the determination that end device 120 is capable of 5G NR SA mode, eNB 215-1 may generate 270 an RRC-ConnectionRelease message, for example, that includes an IdleModeMobilityControlInfo IE, to provide end device 120 with an NR SA neighboring cell (e.g., gNB 215-2) list and cell reselection priority data. For example, the RRC release message may include a cell selection priority list or other form of data that indicates priorities for cell selection. For example, the priority data may indicate (e.g., from highest to lowest) an order of priority. According to another embodiment, the provisioning of cell selection priority data of end device 120 may include sending a suitable SIB message type (e.g., SIB 1, SIB 3, SIB 4, SIB 5, etc.). End device 120 may receive and read the message to direct end device 120 to release the RRC connection and transition to RRC_IDLE mode and enable end device 120 to perform cell reselection 280 accordingly. Thereafter when end device 120 transitions from RRC_IDLE mode to RRC_CONNETCED, end device 120 may camp on 290 a highest priority frequency band of gNB 215-2.

Figure 2B:
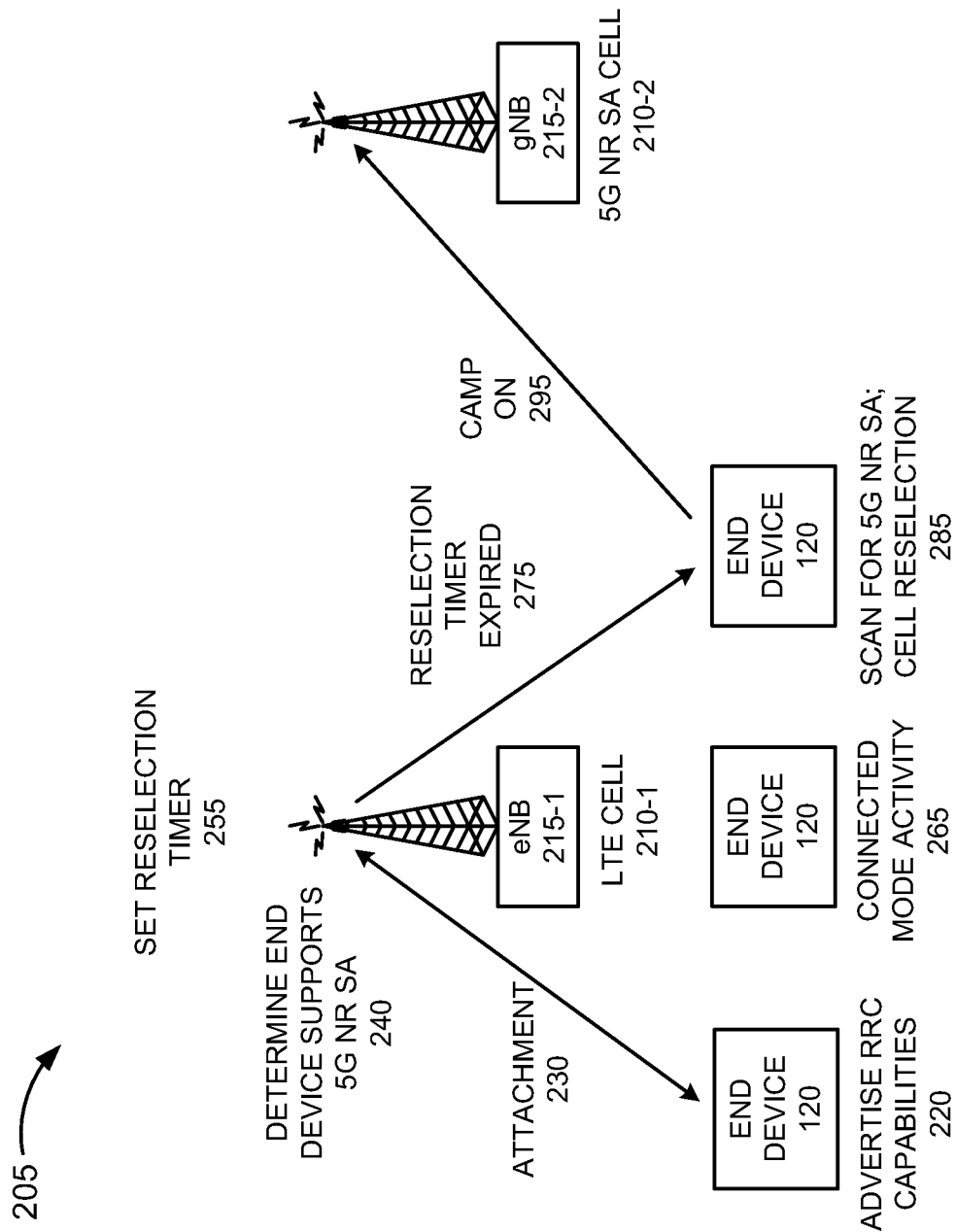

FIG. 2B is a diagram that illustrates an exemplary process 205 of the cell reselection enablement service. For example, as with process 200 described above, end device 120 may, in an attachment procedure 230 with eNB 215-1 of an LTE cell 210-1, advertise 220 the RRC capabilities of end device 120. For example, end device 120 may, using RRC signaling (e.g., an attachment request message), advertise that end device 120 is capable of 5G NR SA or another mode of operation. Based on the advertised information, eNB 215-1 may determine 240 that end device 120 supports 5G NR SA.

Based on the determination that end device 120 is capable of 5G NR SA mode, eNB 215-1 may set 255 a reselection timer to run as long as end device 120 is active 265 in an RRC_CONNECTED mode relative to eNB 215-1. eNB 215-1 may determine that end device 120 remains in connected mode without transitioning to RRC_IDLE mode for a configurable amount of time corresponding to expiration 275 of the reselection timer. Based on the elapsed timer, end device 120 may scan 285 for suitable 5G NR SA cells for cell reselection. In an embodiment, for example, eNB 215-1 may release end device 120 from a connected mode and instruct end device 120 to scan for cells identified in an NR SA neighboring cell list and cell reselection priority data. Alternatively, or additionally, end device 120 may remain in a connected mode and tune away for a short time to perform the scan. The provisioning of cell selection priority data of end device 120 may include sending a suitable SIB message type (e.g., SIB 1, SIB 3, SIB 4, SIB 5, etc.). For example, end device 120 may use the LTE SIB 2 upper layer indicator (ULI) to indicate to end device 120 that 5G NR SA may be present. The ULI may indicate that LTE cell 210-1 supports 5G NR NSA, and because NSA co-exists with SA, end device 120 may use ULI to a initiate a focused scan for 5G NR SA.

According to still another exemplary embodiment, end device 120 may be configured to obtain 5G NR SA measurements relating to neighboring NR RAN devices (e.g., gNB 215-2, etc.). End device 120 may provide these measurements to eNB 215-1 (e.g., via an RRC Connection Reconfiguration Complete message, an RRC Measurement Report message, or another suitable message). eNB 215-1 may determine whether to reselect gNB 215-2 or not based on the measurements (e.g., based on a threshold value). eNB 215-1 may direct end device 120 to camp on 295 selected 5G NR SA cell 210-2 (e.g., gNB 215-2) when the threshold value or other type of configuration is satisfied.

Figure 3:
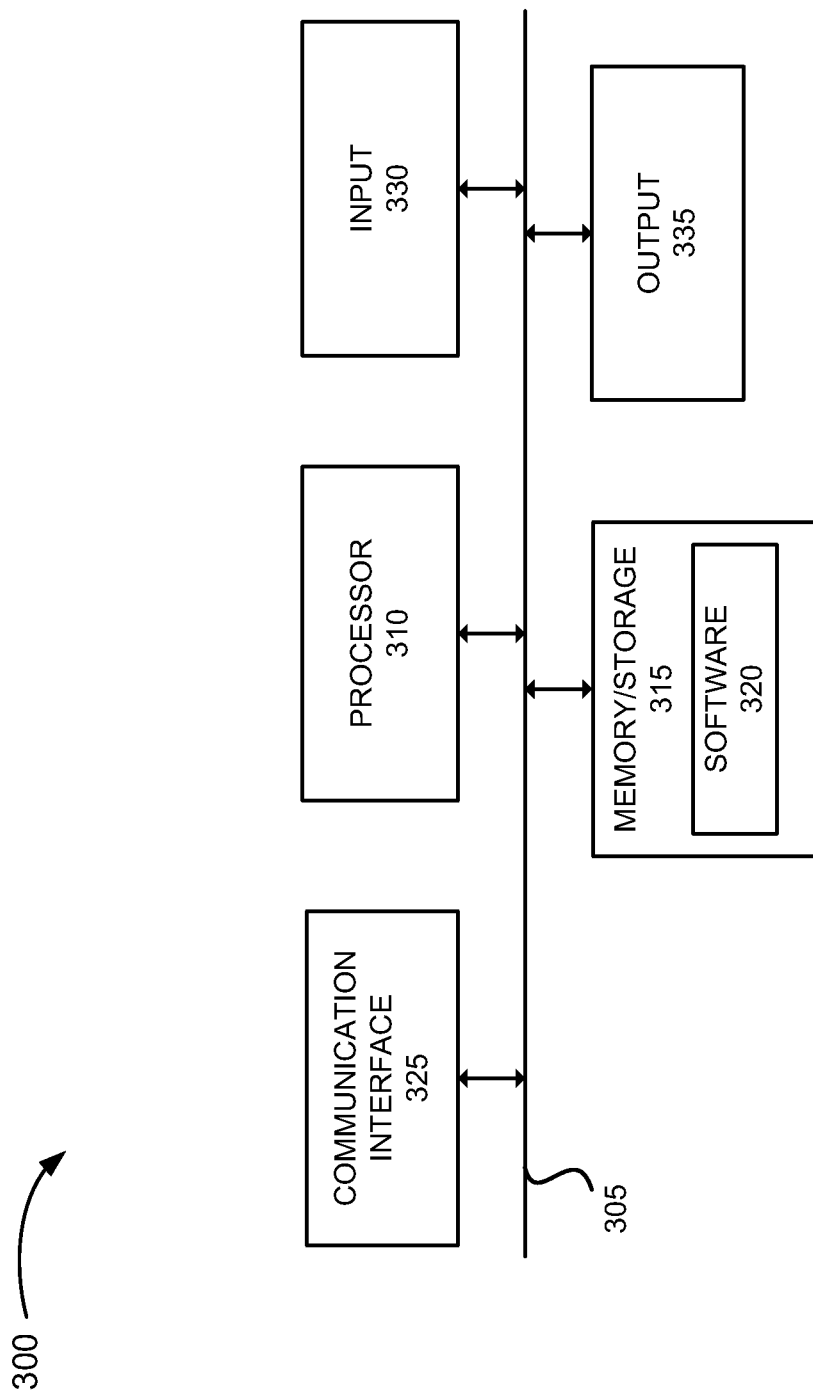
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access devices 115, end devices 120, eNB 215-1, gNB 215-2, and other types of network devices or logic, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to access device 115, software 320 may include an application that, when executed by processor 310, provides a function of the cell reselection enablement service, as described herein. Additionally, for example, with reference to end device 120, software 320 may include an application that, when executed by processor 310, provides a function of the cell reselection enablement service. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. 3Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, application programming interface (API), etc.). Communication interface 325 may be implemented as a point-to-point interface, a service based interface, etc., as previously described.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process and/or a function, as described herein. Alternatively, for example, according to other implementations, device 300 performs a process and/or a function as described herein based on the execution of hardware (processor 310, etc.).

Figure 4:
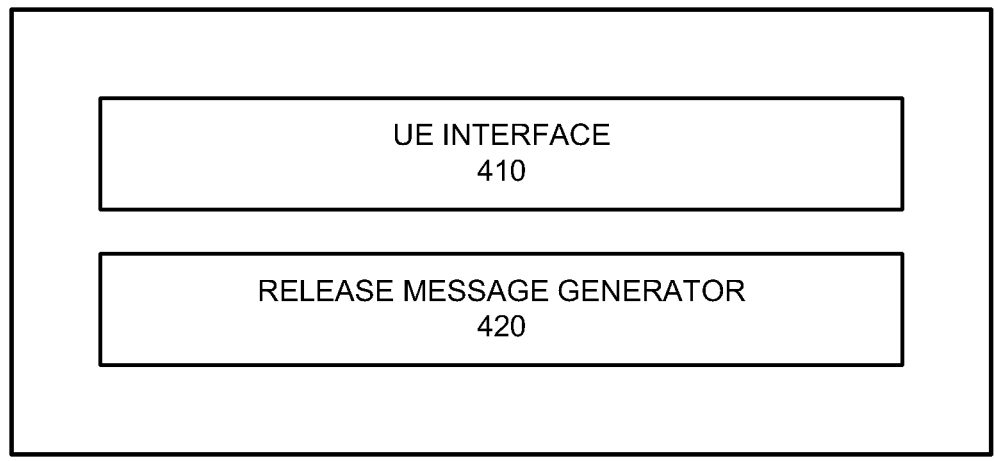
FIGS. 4 and 5 are diagrams illustrating exemplary components of an exemplary access device and an exemplary end device, respectively, as illustrated and described herein.

FIG. 4 is a diagram illustrating exemplary components of access device 115. The components of access device 115 may be implemented, for example, via processor 310 executing instructions (e.g., software 320) from memory/storage 315. Alternatively, some or all of the functional components of access device 115 may be implemented via hard-wired circuitry. As shown in FIG. 4, access device 115 may include a UE interface 410, and a release message generator 420.

Referring to FIG. 4, UE interface 410 may be configured to communicate with end device 120. For example, UE interface 410 may receive an attachment request message from end device 120 and together with end device 120 perform an attachment procedures to establish an RRC connection. In one embodiment, end device 120 may advertise its RRC capabilities to access device 115 via UE interface 410. For instance, end device 120 may advertise that it does or does not support 5G NR SA. UE interface 410 may use end device 120 activity data to determine the appropriate operating mode (e.g., connected, idle, etc.) of end device 120.

Based upon a decision that end device 120 is to be released to idle mode, release message generator 420 may use the advertised information to generate an RRCConnectionRelease message. For example, if end device 120 does not support 5G NR SA, release message generator 420 may generate a non-customized message that does not include 5G NR SA information (e.g., priority data, neighboring cell information, etc.). UE interface 410 may send the non-customized connection release message to end device 120 to enable the mode transition without cell reselection.

Alternatively, if end device 120 does support 5G NR SA, release message generator 420 may generate a customized message that includes 5G NR SA information (e.g., priority data, neighboring cell information, etc.). In an embodiment, the customized message may include some or all of the following data:

mode transition and cell reselection using at least some of the data contained in the customized connection release message.

Although FIG. 4 shows exemplary components of access device 115, in other implementations access device 115 may include fewer components, different components, differently arranged components, or additional components than depicted in FIG. 4. Additionally, or alternatively, one or more components of access device 115 may perform functions described as being performed by one or more other components of access device 115.

Figure 5:
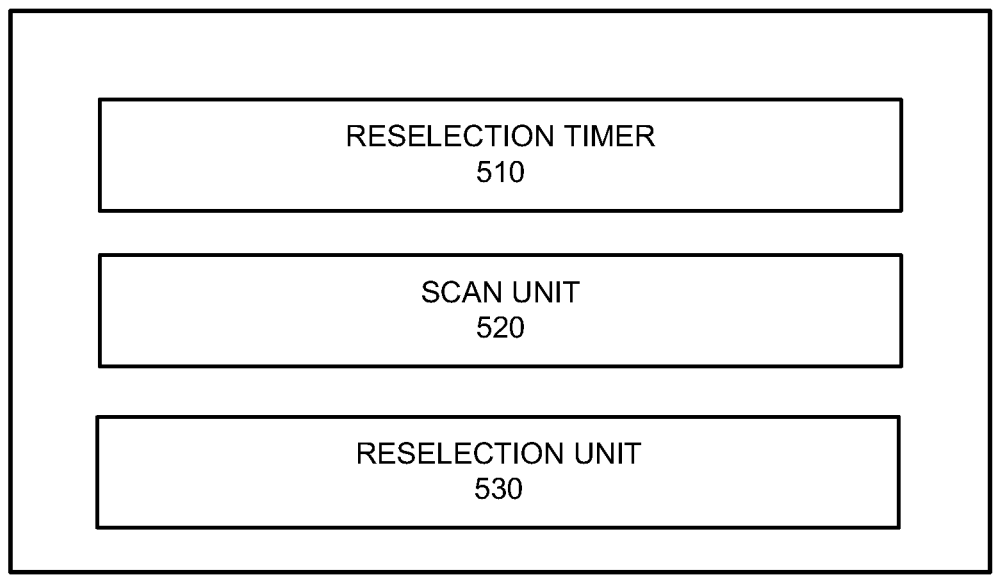

FIG. 5 is a diagram illustrating exemplary components of end device 120. The components of end device 120 may be implemented, for example, via processor 310 executing instructions (e.g., software 320) from memory/storage 315. Alternatively, some or all of the functional components of end device 120 may be implemented via hard-wired circuitry. As shown in FIG. 5, end device 120 may include a reselection timer 510, a scan unit 520, and a reselection unit 530.

Referring to FIG. 5, reselection timer 510 may be configured for activation responsive to end device 120 transitioning to an RRC_CONNECTED mode, and reset when end device 120 is released to RRC_IDLE mode. Alternatively, when a set amount of time has elapsed and end device 120 has remained active in RRC_CONNECTED mode, scan unit 520 may be activated to scan for base stations associated with a particular RAT, 5G NR SA, for example. In an embodiment, scan unit 520 may, using a stored list of prioritized bands or channels, scan for 5G NR SA neighboring cells. If results of the scan do not discover any suitable 5G NR SA cells, the connection with the LTE carrier may be maintained and reselection timer 510 reset. In another embodiment, reselection timer 510 is reset to amount of time that is greater than the immediately previous expiration time or the same amount of time, for example. Alternatively, if results of the scan discover a suitable 5G NR SA cell, reselection unit 530 may reselect the 5G NR SA cell (e.g., 5G NR SA cell 210-2) over LTE cell 210-1, and accordingly camp on gNB 215-2.

Although FIG. 5 shows exemplary components of end device 120, in other implementations end device 120 may include fewer components, different components, differently arranged components, or additional components than depicted in FIG. 5. Additionally, or alternatively, one or more components of end device 120 may perform functions described as being performed by one or more other components of end device 120.

Figure 6:
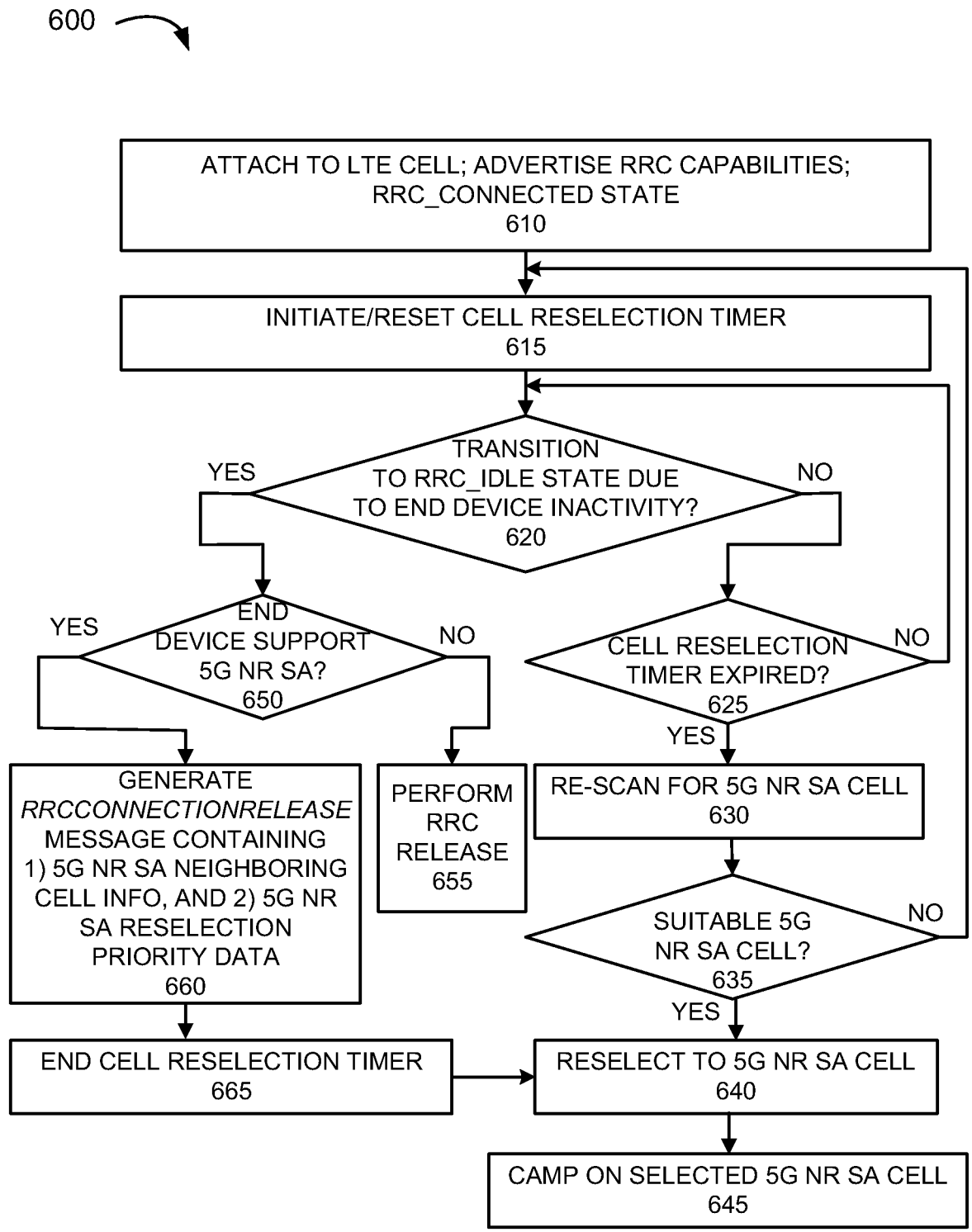
FIG. 6 is a flow diagram illustrating an exemplary process of an exemplary embodiment of the cell reselection enablement service.

FIG. 6 is a flow diagram illustrating an exemplary process 600 of an exemplary embodiment of the cell reselection enablement service. According to an exemplary embodiment, access device 115 and/or end device 120 may perform one or more steps of process 600. According to an exem-

TABLE 1

| | |
|---|---|
| FreqPriorityListNR-r15 ::= | SEQUENCE (SIZE (1..maxPreq)) OF FreqPriorityNR-r15 |
| FreqPriorityNR-r15 ::= | SEQUENCE ( |
|   carrierEreq-r15 |   ARFCN-ValueNR-r15, |
|   cellReselectionPriority-r15 |   CellReselectionPriority, |
|   cellReselectionSubPriority-r15 |   CellReselectionSubPriority-r13     OPTIONAL -- Need OR |
| } | |

Data formats other than what is shown in Table 1 are possible. UE interface 410 may send the customized connection release message to end device 120 to enable the plary implementation, processor 310 executes software 320 to perform a step illustrated in FIG. 6 and described herein. Alternatively, a step illustrated in FIG. 6 and described herein, may be performed by execution of hardware only. According to an exemplary environment, process 600 may be performed in a multi-RAT RAN (e.g., a 5G-RAN and an E-UTRAN) and associated complementary networks, as illustrated and described herein. According to an exemplary embodiment, process 600 may be performed when end device 120 is operating in an RRC connected mode and/or RRC idle mode relative to access device 115.

Referring to FIG. 6, in block 610, end device 120 may attach to LTE cell 210-1; generate a message that advertises end device 120 RRC capabilities; and establish an RRC connection to eNB 215-1. For example, end device 120 may advertise to eNB 215-1 whether or not end device 120 supports 5G NR SA. eNB 215-1 may provide LTE coverage to end device 120, and end device 120 may be operating in an RRC connected mode relative to eNB 215-1.

In block 615, while end device 120 is in RRC connected mode, end device 120 may initiate a cell reselection timer to expire after a configurable amount of time. For example, the cell reselection timer may be set to expire after several seconds or several minutes while end device 120 remains in RRC connected mode.

In block 620, based on the monitored activity of end device 120, eNB 215-1 determines whether end device is to transition to RRC idle mode due to inactivity of end device 120 that exceeds a threshold amount of time. Based upon a determination that end device 120 is not to change RRC modes (block 620—NO), at block 625 end device 120 determines whether the cell reselection timer has expired. If the cell reselection timer has not expired (block 625—NO), process 600 may return to block 620.

If the cell reselection timer has expired (block 625—YES), at block 630 end device 120 may perform a scan for base stations associated with a 5G NR SA cell. For example, eNB 215-1 may release end device 120 from RRC connected mode to enable end device 120 to perform the scan in RRC idle mode. Additionally or alternatively, end device 120 may perform a tune away and scan for the base stations associated with a 5G NR SA cell. For example, end device 120 may use a stored list of prioritized carriers of 5G NR SA neighboring cells to perform the search. At block 635, end device 120 determines whether results of the scan identify any suitable 5G NR SA cells.

When no suitable 5G NR SA cells are identified (block 635—NO), process 600 may return to block 615 and end device 120 may reset the cell reselection timer. For example, end device 120 may configure the cell reselection timer to expire after a shorter amount of time, the same amount of time, or a greater amount of time. In one embodiment, to conserve processing and/or power resources, the cell reselection timer may be reset using progressively longer periods of time (e.g., "telescoping" values. In another embodiment, the configurable times may be set based on a mobility of end device 120.

When end device 120 identifies a suitable 5G NR SA cell, such as 5G NR SA cell 210-2 (block 635—YES), at block 640 end device 120 may reselect to 5G NR SA cell 210-2 and end device 120 may camp on a 5G NR SA cell, such as gNB 215-2 (block 645).

Returning to block 620, based upon the serving LTE cell (e.g., LTE cell 210-1) determining that end device 120 is to transition to RRC idle mode (block 620—YES), at block 650 the serving LTE cell determines whether end device 120 supports 5G NR SA. For example, eNB 215-1 may examine the advertised capability information provided by end device 120. If end device 120 does not support 5G NR SA (block 650—NO), at block 655 eNB 215-1 may generate an RRC connection release message and send to end device 120 to release end device to RRC idle mode.

If instead end device 120 does support 5G NR SA (block 650—YES), at block 660 eNB 215-1 may generate a message that includes NR SA neighbor and reselection priority information. For example, eNB 215-1 may generate a customized RRC connection release message for sending to end device 120 to release end device to RRC idle mode. For example, the customized RRC connection release message may include 5G NR SA neighboring cell information that identifies 5G NR SA cells that end device 120 may reselect. Additionally, the customized RRC connection release message may include 5G NR SA reselection priority data that identifies 5G NR SA cells that end device 120 may reselect. At block 665, end device 120 may end the cell reselection timer. At block 640 end device 120 may reselect to 5G NR SA cell 210-2 and end device 120 may camp on gNB 215-2 (block 645).

FIG. 6 illustrates an exemplary process 600 of the cell reselection enablement service that uses non-SIB messages to provide 5G NR SA neighboring cell information and cell reselection priority data, however, according to other embodiments, process 600 may include additional operations, fewer operations, and/or different operations than those illustrated in FIG. 6 and described herein. For example, process 600 may include using the LTE SIB 2 ULI to indicate to end device 120 that 5G NR SA may be present, and end device 120 may use the ULI to more aggressively re-scan (e.g., in terms of number of scans, duration of scans, etc.) for 5G NR SA cells compared to not receiving the ULI. In addition, process 600 may include allowing the cell reselection timer to continue to run after end device 120 transitions to RRC idle mode, to avoid delays in performing the re-scan.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the processes illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
generating, by wireless stations of a multi-radio access technology (RAT) radio access network (RAN) that includes a new radio (NR) RAN and a RAN of a Long Term Evolution (LTE) network, a non-system information block (non-SIB) message that includes cell reselection priority information and NR stand-alone (SA) neighboring cell information, wherein an order of priority configures an end device attached to the LTE RAN to re-select to a first radio frequency (RF) channel of a first NR SA neighboring cell;
deactivating, based on the generating of the non-SIB message, an initated NR SA reselection timer; and
transmitting, by the wireless station, the non-SIB message to the end device.

2. The method of claim 1, wherein the non-SIB message comprises a radio resource control (RRC) connection release message, the method further comprising:
determining that a duration of inactivity of the end device while in an RRC connected mode with the LTE network exceeds a threshold amount of time, wherein the RRC connection release message configures the end device to transition from the RRC connected mode to an RRC idle mode.

3. The method of claim 1, further comprising:
determining, based on advertised radio resource control (RRC) capabilities, that the end device supports NR SA capabilities, wherein the generating of the non-SIB message is performed based upon the determining.

4. The method of claim 1, further comprising:
initiating, upon a transition of the end device to a radio resource control (RRC) connected mode, the NR SA reselection timer.

5. The method of claim 1, further comprising:
transmitting, responsive to an expiration of the NR SA reselection timer, the cell reselection priority information and NR SA neighboring cell information to the end device, wherein the expiration of the NR SA reselection timer configures the end device to scan for a second RF channel of a second NR SA neighboring cell before the generating of the non-SIB message.

6. The method of claim 5, further comprising:
determining that a duration of inactivity of the end device while in an RRC connected mode with the LTE network does not exceed a threshold amount of time, wherein the generating of the non-SIB message is based on a determination that the scan fails to detect the second RF channel of the second NR SA neighboring cell.

7. The method of claim 5, further comprising:
determining that a duration of inactivity of the end device while in an RRC connected mode with the LTE network does not exceed a threshold amount of time, wherein the expiration of the NR SA reselection timer occurs while the end device is in the RRC connected mode.

8. A system comprising:
a wireless station of a multi-radio access technology (RAT) radio access network (RAN) that includes a new radio (NR) RAN and a RAN of a Long Term Evolution (LTE) network, wherein each wireless station comprises a processor configured to:

generate a non-system information block (non-SIB) message that includes cell reselection priority information and NR stand-alone (SA) neighboring cell information, wherein an order of priority configures an end device attached to the LTE RAN to reselect to a first radio frequency (RF) channel of a first NR SA neighboring cell;

deactivate, based on the generation of the non-SIB message, an initated NR SA reselection timer; and transmit the non-SIB message to the end device.

9. The system of claim 8, wherein the non-SIB message comprises a radio resource control (RRC) connection release message, the processor further configured to:

determine that a duration of inactivity of the end device while in an RRC connected mode with the LTE network exceeds a threshold amount of time, wherein the RRC connection release message configures the end device to transition from the RRC connected mode to an RRC idle mode.

10. The system of claim 8, wherein the processor is further configured to:

determine, based on advertised radio resource control (RRC) capabilities, that the end device supports NR SA capabilities, wherein the generating of the non-SIB message is performed based upon the determination.

11. The system of claim 8, wherein the processor is further configured to:

initiate, upon a transition of the end device to a radio resource control (RRC) connected mode, the NR SA reselection timer.

12. The system of claim 8, wherein the processor is further configured to:

transmit, responsive to an expiration of the NR SA reselection timer, the cell reselection priority information and NR SA neighboring cell information to the end device, wherein the expiration of the NR SA reselection timer configures the end device to scan for a second RF channel of a second NR SA neighboring cell before the generating of the non-SIB message.

13. The system of claim 12, wherein the processor is further configured to:

determine that a duration of inactivity of the end device while in an RRC connected mode with the LTE network does not exceed a threshold amount of time, wherein the generating of the non-SIB message is based on a determination that the scan fails to detect the second RF channel of the second NR SA neighboring cell.

14. The system of claim 12, wherein the processor is further configured to:

determine that a duration of inactivity of the end device while in an RRC connected mode with the LTE network does not exceed a threshold amount of time, wherein the expiration of the NR SA reselection timer occurs while the end device is in the RRC connected mode.

15. A non-transitory computer-readable storage medium storing instructions executable by processors of a wireless station of a multi-radio access technology (RAT) radio access network (RAN) that includes a new radio (NR) RAN and a RAN of a Long Term Evolution (LTE) network, which when executed cause the wireless station to:

generate a non-system information block (SIB) message that includes cell reselection priority information and NR stand-alone (SA) neighboring cell information, wherein an order of priority configures an end device attached to the LTE RAN to reselect to a first radio frequency (RF) channel of a first NR SA neighboring cell;

deactivate, based on the generation of the non-SIB message, an initated NR SA reselection timer; and broadcast the non-SIB message to the end device.

16. The non-transitory computer-readable storage medium of claim 15, wherein the non-SIB message comprises a radio resource control (RRC) connection release message, further comprising instructions that cause the wireless station to:

determine that a duration of inactivity of the end device while in an RRC connected mode with the LTE network exceeds a threshold amount of time, wherein the RRC connection release message configures the end device to transition from the RRC connected mode to an RRC idle mode.

17. The non-transitory computer-readable storage medium of claim 15, wherein the instructions further cause the wireless station to:

determine, based on advertised radio resource control (RRC) capabilities, that the end device supports NR SA capabilities, wherein the generating of the non-SIB message is performed based upon the determination.

18. The non-transitory computer-readable storage medium of claim 15, wherein the instructions further cause the wireless station to:

initiate, upon a transition of the end device to a radio resource control (RRC) connected mode, the NR SA reselection timer.

19. The non-transitory computer-readable storage medium of claim 15, wherein the instructions further cause the wireless station to:

transmit, responsive to an expiration of the NR SA reselection timer, the cell reselection priority information and NR SA neighboring cell information to the end device, wherein the expiration of the NR SA reselection timer configures the end device to scan for a second RF channel of a second NR SA neighboring cell before the generating of the non-SIB message.

20. The non-transitory computer-readable storage medium of claim 19, wherein the instructions further cause the wireless station to:

determine that a duration of inactivity of the end device while in an RRC connected mode with the LTE network does not exceed a threshold amount of time, wherein the generating of the non-SIB message is based on a determination that the scan fails to detect the second RF channel of the second NR SA neighboring cell.

* * * * *